Oct. 13, 1959     W. G. POWELL     2,908,329
BAND CUTTING AND GROUPING MACHINE
Filed Dec. 10, 1956     4 Sheets-Sheet 3
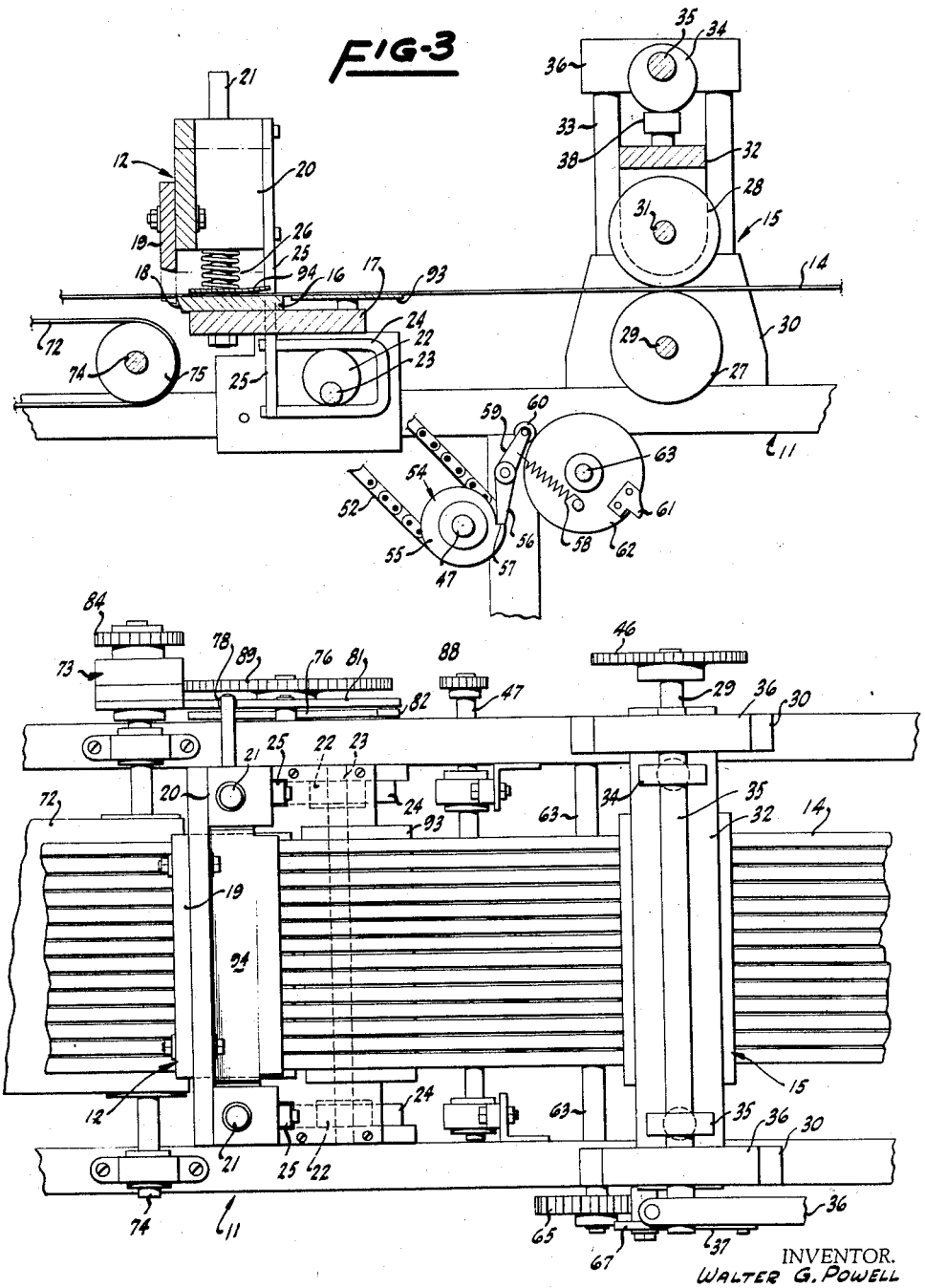
INVENTOR.
WALTER G. POWELL
BY
Mellin and Hanscom
ATTORNEYS Oct. 13, 1959 W. G. POWELL 2,908,329
BAND CUTTING AND GROUPING MACHINE
Filed Dec. 10, 1956 4 Sheets-Sheet 4

INVENTOR.
WALTER G. POWELL
BY
Mellin and Hanscom
ATTORNEYS

United States Patent Office 2,908,329
Patented Oct. 13, 1959

2,908,329

BAND CUTTING AND GROUPING MACHINE

Walter G. Powell, Covina, Calif., assignor to Band-Ti Mfg. Co., Los Angeles, Calif., a corporation of California Application December 10, 1956, Serial No. 627,478

3 Claims. (Cl. 164—49)

This invention relates to a machine for making band-ties, and particularly to a machine for cutting sections of predetermined lengths from strips and for collecting the sections in groups containing a predetermined number of the sections.

It is among the objects of this invention to provide a mechanism for cutting a plurality of strips simultaneously into sections of uniform lengths.

It is also an object to provide mechanism for delivering the severed sections into groups, each including a predetermined number of sections to be packaged.

Another object is to provide a machine of the character described wherein a cutting mechanism and a delivery mechanism are operated through a common drive in mutually timed relation for controlling the length and the count of sections cut simultaneously from a plurality of strips of material fed to the cutting mechanism.

Other objects include the provision of an improved structure and arrangement of parts adapted to obtain increased effectiveness in the manufacture and operation of the machine.

One form which the invention may assume is exemplified in the following description and illustrated by way of example in the accompanying drawings, in which:

Fig. 3 is a fragmental longitudinal sectional view, the plane of the section being indicated by the line 3—3 of Fig. 2.

Fig. 4 is a fragmental plan view of the unit shown in Fig. 1 and taken on the line 4—4 thereof.

Figure 1:
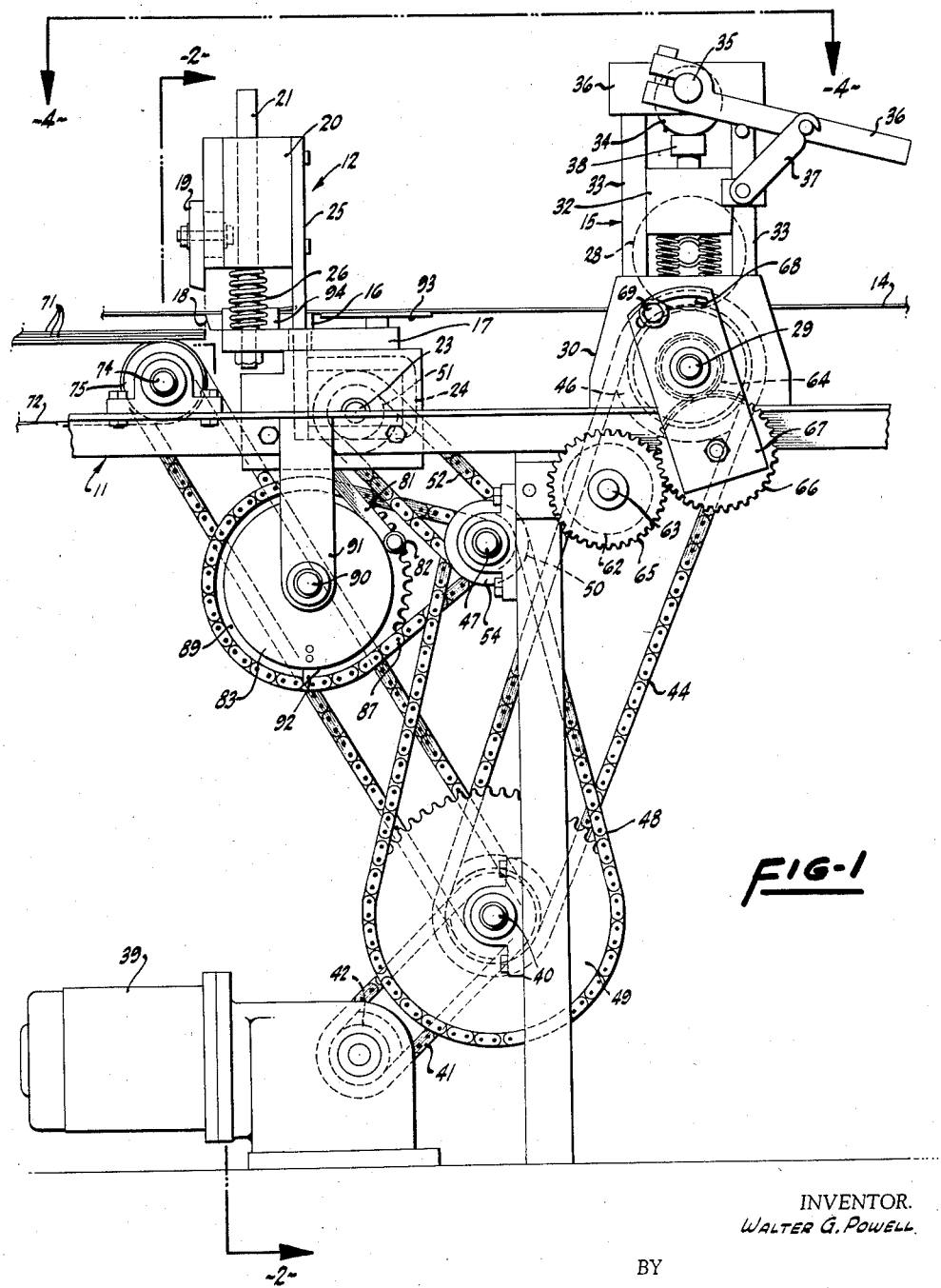
Fig. 1 is a fragmental side elevational view showing the drive mechanism of the unit.
Figure 2:
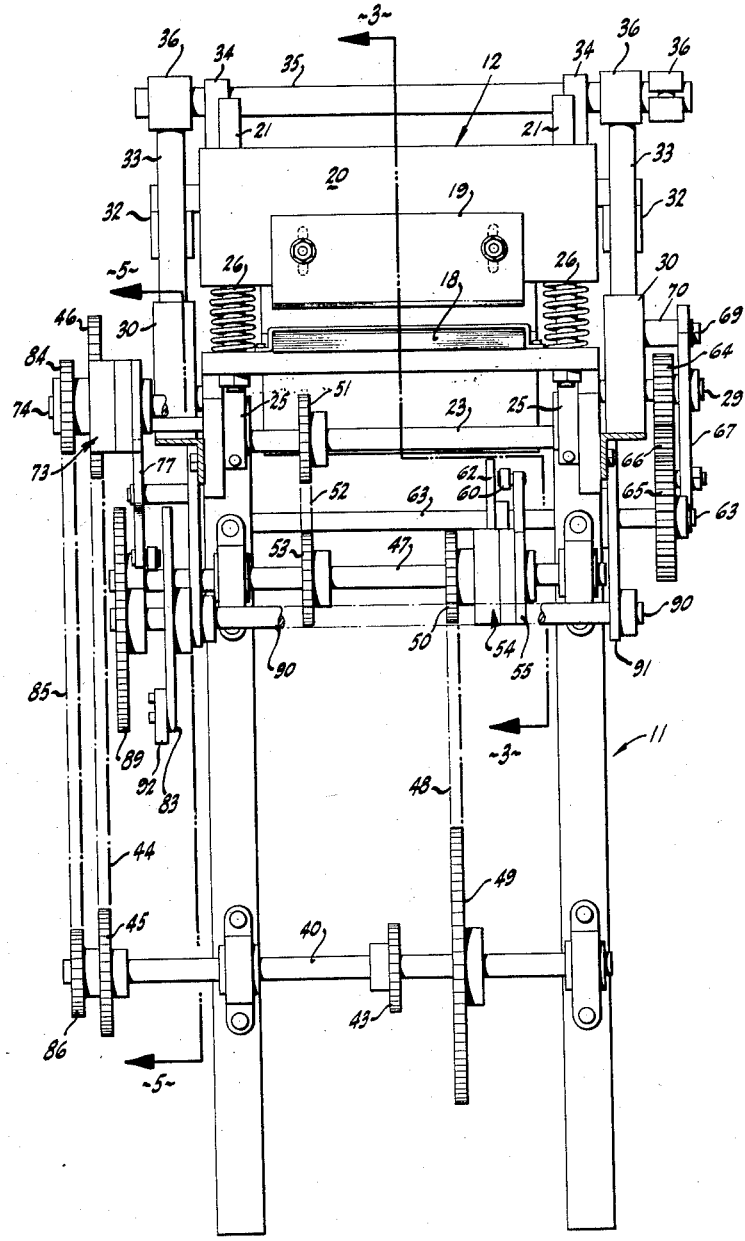
Fig. 2 is a transverse vertical sectional view, the plane of the section being indicated by the line 2—2 of Fig. 1.

In terms of broad inclusion, the device of the present invention comprises a cutter, actuated in timed relation to the advance of a plurality of strips of band forming material thereto, for severing sections of uniform lengths from the several strips, simultaneously. The sections are directed onto a conveying means, which is actuated in timed relation to the operation of the cutter, to advance the group of sections cut by a predetermined number of operations of the cutter. By an appropriate selection of gear ratios, the machine may be set up to cut sections of any desired length, and to collect them in accurately counted groups containing any desired multiple of the number of strips fed at one time to the cutter.

In terms of greater detail, the machine of the present invention comprises a frame designated in general by the numeral 11. Mounted upon the frame in a cutting mechanism, designated in general by the numeral 12, to which strip material 14 is directed by a feeding mechanism, designated in general by the numeral 15.

The cutting mechanism comprises a fixed plate 16 secured to a cross bar 17 extending transversely between the sides of the frame 11 and provided with a shearing edge 18. A movable shear blade 19 is secured to a carriage 20 mounted for reciprocating movement upon a pair of vertically disposed guide posts 21. The carriage 20 is reciprocated by a pair of cams 22 secured to a shaft 23 journalled upon the frame 11. The cams 22 engage yokes 24 secured to the ends of the carriage 20 by bars 25, as best shown in Fig. 3 of the drawings. The throw of the cams 22 is designed to move the carriage between its raised position, shown in full lines in Fig. 3, and its lowermost position, indicated in broken lines. Springs 26, mounted over the guide posts 21 below the carriage, normally urge the carriage toward its uppermost position.

The feeding mechanism 15 comprises a pair of feed rollers 27 and 28. The lower roller is mounted upon a shaft 29 journalled in fixed bearings provided in bearing brackets 30. The upper roller 28 is mounted upon a shaft 31, the ends of which are journalled upon a carriage 32 slidably mounted between guides 33 extending upwardly from the brackets 30. The carriage is movable to and from a driving position in which the upper roller presses the strip material 14 firmly against the lower roller 27, as indicated in Fig. 3 of the drawings.

As illustrated, the carriage is actuated by means of a pair of eccentric cams 34 secured upon a cam shaft 35 journalled in bearing blocks 36 supported by the guides 33. The shaft 35 is arranged to be moved manually through about 180° of movement, to raise and lower the carriage, by means of a lever 36. A latch bar 37 is provided for normally securing the lever in driving position with the cams holding the carriage in its lowermost position. The cams 34 engage pins 38 mounted upon the carriage, the pins being adjustable to control the pressure exerted by the upper roller 28 against the strip material as it is fed past the feed rollers.

The feeding mechanism is actuated by a motor 39 connected to a main drive shaft 40 by suitable driving means, such as a sprocket chain 41 extending over sprockets 42 and 43 upon the motor and the drive shaft, respectively. The lower feed roller 27 is driven by a sprocket chain 44 extending over sprockets 45 and 46 upon the main drive shaft 40 and the feed roller shaft 29, respectively. The roller 27 is rotated continuously at a constant speed, but is effective for feeding the strip material 14 only when the upper roller 28 is pressed against it with sufficient pressure to grip the strip material.

The cutting mechanism is operated intermittently in timed relation to the feeding mechanism from a shaft 47 suitably journalled upon the frame 11. The shaft 47 is driven by a sprocket chain 48 extending over a sprocket 49 secured on the main drive shaft 40 and over a sprocket 50 on the shaft 47. A sprocket 51, secured to the cam shaft 23, is driven by a chain 52, which extends over a sprocket 53 mounted upon the shaft 47. The sprocket 50 drives the shaft 47 by means of a one-cycle clutch 54, of any suitable type, as, for example, an over running ball clutch having a clutch control disc 55, which permits the sprocket 50 to turn freely upon the shaft 47 while the disc is held against rotation, and which locks the sprocket in driving engagement with the shaft when the clutch disc is released.

As illustrated in Fig. 3 of the drawings, the clutch disc 55 is arranged to be held in clutch-releasing position by a pivotal dog 56 normally held in engagement with a shoulder 57 by a spring 58. The dog is provided with a trip arm 59 having a roller 60 arranged to be engaged by a lug 61 carried by a timing disc 62. Displacement of the dog 56, when tripped by the lug 61, releases the disc 55 so that the sprocket 50 is clutched to the shaft 47 through one full revolution. When the shoulder 57 again reaches the dog, the disc is stopped and the clutch released.

The timing disc 62 is mounted upon a shaft 63 parallel to the drive shaft 47 and roller shaft 29. The shaft 63 is driven by a train of gears, comprising a drive gear 64 mounted upon the shaft 29 and a driven gear 65 upon the shaft 63. The gears 64 and 65 are of a ratio selected to rotate the shaft 63 at a desired speed, driving power being transmitted from the gear 64 to the gear 65 through an idler gear 66. In order to facilitate the substitution of gear 65 of different ratio for driving the timing disc at different speeds relative to the shaft 29, the idler gear 66 is journalled upon a bracket arm 67 pivoted upon the shaft 29. An arcuate slot 68 is formed in the arm 67 to engage a machine screw 69 extending through the slot and threaded into a shouldered abutment 70 upon the frame 11. The bracket permits the idler 66 to be swung around the driving gear 64 to mesh with a driven gear 65 of selected size adapted to cause a dog 56 to be tripped periodically after desired degrees of angular movement of the feed roller 27. The screw 69 is tightened to secure the arm 67 in a desired position.

During each one-cycle operation of the clutch 55, the cutter carriage 20 is moved through one complete cutting operation, in the course of which the cutting blade 19 is moved downwardly to sever whatever length of the strip material 14 has been advanced therepast by the feed rollers 27 and 28. Since the strip material is fed at a constant rate, the length of the sections 71 cut from the supply at each operation of the cutter will depend upon the frequency of operation of the cutter, which, in turn, is a function of the gear ratio of the gears 64—65. By selecting a desired gear ratio for the gears 64 and 65, the cutter can be operated at intervals such as to sever desired lengths 71 from the strip material, which length may be varied by varying the gear ratio.

Lengths or sections 71 cut from the strip material are received upon a conveyor 72 operated intermittently to advance the lengths cut by a predetermined number of operations of the cutter. This is accomplished by means of a one-cycle clutch 73 operating in connection with the drive shaft 74 of a pulley 75 over which the conveyor 72 is extended. The clutch 73 is similar to the clutch 54, and operates in similar manner to actuate the conveyor through one step of its movement after a predetermined number of operations of the cutter.

Figure 5:
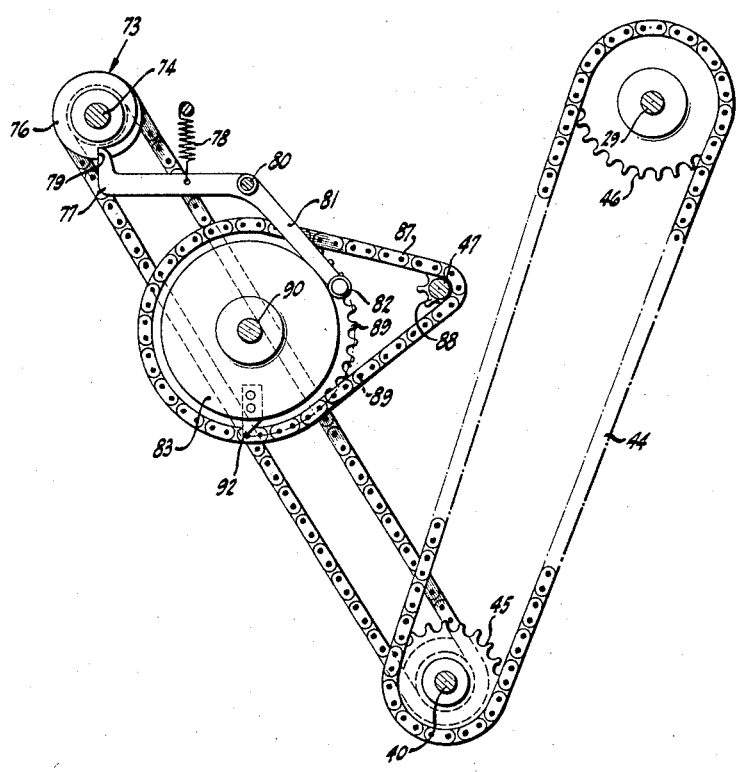
Fig. 5 is a sectional detail view of the clutch and drive mechanism as viewed upon the plane indicated by the line 5—5 of Fig. 2.

As best illustrated in Fig. 5 of the drawing, the timing for the conveyor comprises a clutch disc 76, normally held against rotation by a dog 77, which is urged by a spring 78 into engagement with a shoulder 79 upon the disc. The dog 77 is pivoted, as at 80, and is provided with a trip arm 81 having a roller 82, which rides upon the periphery of a timing disc 83. The clutch 73 operates to direct power from a sprocket 84 to the drive shaft 74, the sprocket 84 being actuated by a chain 85 extended over a sprocket 86 upon the main drive shaft 40. The timing disc 83 is driven by a sprocket chain 87, which extends over a drive sprocket 88 upon the shaft 47 and a driven sprocket 89 mounted upon a shaft 90 journalled upon a bracket arm 91.

The trip arm 81 is arranged to be displaced, for disengaging the dog 77 from the shoulder 79, by a tripping lug 92. The sprockets 88 and 89 are of a gear ratio such as to cause the lug 92 to trip the arm 81 and dog 77 after a desired number of operations of the cutter. A ratio of about 5 to 1 is indicated in the drawings, but, of course, sprockets having a different ratio may be substituted, as desired. Each time the dog 77 is released, the conveyor will be advanced a step, its movement being interrupted when the shoulder 79 is moved through 360° to again engage the dog 77. This movement of the conveyor segregates the sections 71, which have been cut from the strip material 14, in a group readily separable from groups cut during the preceding and succeeding cycles of operation.

The strip material may be supplied to the feed rollers 27—28 as a single strip. Preferably, however, it is fed as a plurality of narrow strips produced by slitting a wide strip into bands before it reaches the feed mechanism. Since the slitting mechanism forms no part of the present invention, a detailed disclosure of such mechanism is herein unnecessary. Similarly, the devices for packaging the groups of sections 71 form no part of the present invention and hence need not be disclosed herein.

In operation, the strip material 14 is advanced continuously by the feed rollers 27—28 to the cutting mechanism 12. The cutter is actuated intermittently to sever the lengths of the strip material which have been advanced therepast during the interval between successive cycles of cutter operation. As above explained, this varies in accordance with the gear ratio of the gears 64 and 65. The strip material is supported upon a platform 93 as it approaches the cutter, and is held in cutting position by a guide 94 adjacent the cutting edge 18 to prevent buckling of the oncoming strip during the cutting operation.

After a predetermined number of operations of the cutting mechanism, the conveyor 72 is advanced a step, so as to separate the group of sections cut during each cycle from the groups cut during other cycles. As a result, groups of sections of uniform length are collected for packaging in accurately counted number. Thus, assuming that ten strips are fed to the cutter, ten sections will be cut simultaneously at each operation of the cutter. If then the conveyor is adavanced after five operations of the cutter, a group of fifty sections 71 will have been accumulated and segregated upon the conveyor. The operation may be continuous, but the feed of strip material may be interrupted, when desired, by raising the upper feed roller 28 out of driving position by means of the cams 34 and lever 36.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. In a machine for making band-ties and the like, a power drive means, a pair of continuously rotating feed rollers driven by said power drive means for advancing a plurality of side by side bands through said machine, a cutter mounted transversely of the path of advance of said bands and adapted when actuated to sever said bands, one-cycle clutch means for connecting said power drive means to said cutter, detent means for declutching said one-cycle clutch means, and cam means driven with said rollers by said power drive means for actuating said detent means after a predetermined number of rotations of said feed rollers.

2. In a machine for making band-ties and the like, a power drive means, a pair of continuously rotating feed rollers driven by said power drive means for advancing a plurality of side by side bands through said machine, a cutter mounted transversely of the path of advance of said bands and adapted when actuated to sever said bands, a first one-cycle clutch means for connecting said power drive means to said cutter, detent means for declutching said one-cycle clutch means, cam means driven with said rollers by said power drive means for actuating said detent means after a predetermined number of rotations of said feed rollers, a conveyor for receiving said severed band sections, a second one-cycle clutch means for connecting said power drive means to said conveyor, and means responsive to a predetermined number of actuations of said cutter for initiating said second one-cycle clutch means.

3. In a machine for making band-ties and the like, a power drive means, a pair of continuously rotating feed rollers driven by said power driven means for advancing a plurality of side by side bands through said machine, a cutter mounted transversely of the path of advance of said bands and adapted when actuated to sever said bands, a first one-cycle clutch means for connecting said power drive means to said cutter, detent means for declutching said one-cycle clutch means, cam means driven with said rollers by said power drive means for actuating said detent means after a predetermined number of rotations of said feed rollers, a conveyor for receiving said severed band sections, a second one-cycle clutch means for connecting said power drive means to said conveyor, detent means for declutching said second one-cycle clutch means, and cam means driven with said cutter by said power drive means for actuating said last mentioned detent means after a predetermined number of cutter actuations.

References Cited in the file of this patent

UNITED STATES PATENTS

| | | |
|---|---|---|
| 204,097 | Sawyer | May 21, 1878 |
| 242,280 | De Beauvais | May 31, 1881 |
| 1,115,347 | Suggs | Oct. 27, 1914 |
| 1,718,145 | Hartman | June 18, 1929 |
| 2,509,760 | Crafton | May 30, 1950 |
| 2,548,427 | Fernbach | Apr. 10, 1951 |
| 2,789,585 | Bank | Apr. 23, 1957 |

FOREIGN PATENTS

| | | |
|---|---|---|
| 408,057 | Great Britain | Apr. 5, 1934 |